United States Patent [19]

Constien et al.

[11] 4,220,566

[45] Sep. 2, 1980

[54] AQUEOUS BASED SLURRY CONTAINING ENEDIOL BREAKER AND METHOD FOR FORMING A CONSOLIDATED GRAVEL PACK

[75] Inventors: Vernon G. Constien, Owasso; Peter E. Clark, Tulsa, both of Okla.

[73] Assignee: The Dow Chemical Company, Midland, Mich.

[21] Appl. No.: 888,811

[22] Filed: Mar. 21, 1978

[51] Int. Cl.$^2$ .................. C08L 1/28; E21B 33/13; E21B 43/02

[52] U.S. Cl. .................. 260/13; 166/276; 166/278; 166/295; 166/300; 260/29.2 EP; 260/37 EP

[58] Field of Search .................. 260/13, 29.2 EP; 166/276, 278, 295, 300

[56] References Cited

U.S. PATENT DOCUMENTS

| | | | |
|---|---|---|---|
| 4,074,760 | 2/1978 | Copeland et al. | 166/276 |
| 4,101,474 | 7/1978 | Copeland et al. | 260/13 |
| 4,133,383 | 1/1979 | Ely | 166/295 |

*Primary Examiner*—Edward M. Woodberry
*Attorney, Agent, or Firm*—L. W. White

[57] ABSTRACT

A compound containing an aromatic or α-carbonyl enediol functional group is effectively employed as a breaker for the gelled aqueous carrier fluid in aqueous epoxy resin slurries of the type suitable for use in emplacing a permeably consolidated particulate mass in communication with a permeable subterranean formation.

12 Claims, No Drawings

AQUEOUS BASED SLURRY CONTAINING ENEDIOL BREAKER AND METHOD FOR FORMING A CONSOLIDATED GRAVEL PACK

BACKGROUND OF THE INVENTION

A. Field of the Invention

The invention relates to a method and a slurry suitable for use in treating a well penetrating an unconsolidated formation by emplacing a resin consolidated pack of particulate material adjacent the fomation.

B. Description of the Prior Art

A description of the art in the field of consolidated gravel packing is found in commonly assigned U.S. Pat. No. 4,074,760, issued Feb. 21, 1978 to Claude T. Copeland and Vernon G. Constien from application Ser. No. 737,813 filed Nov. 1, 1976. Ser. No. 807,094 filed June 16, 1977, now U.S. Pat. No. 4,101,474 issued July 18, 1978, is a divisional thereof.

Said invention of Copeland and Constien represents a significant breakthrough in the art of consolidated gravel packing whereby consolidated gravel packs of a quality meeting high commercial standards could for the first time be formed from slurries having an aqueous carrier fluid.

In an improvement on said pioneer invention of Copeland and Constien, David R. Carpenter and said Constien discovered that polyvalent metal cation contamination of a slurry such as that disclosed by Copeland and Constien could be controlled by use of a chelating agent. Said invention of Carpenter and Constien is the subject of commonly assigned Ser. No. 737,455 filed Nov. 1, 1976, now U.S. Pat. No. 4,081,030 issued Mar. 28, 1978.

In each of the foregoing applications, it was taught that the aqueous carrier fluid could include a viscosity builder, i.e., a gelling agent, to improve the solids carrying capacity of the slurry. It was also taught that the fluid could contain a breaker for the gelling agent. Enzyme breakers and ammonium persulfate were specifically mentioned.

The breakers contemplated at that time, however, have not proved particularly satisfactory. Although such slurries are operable, results with such breakers are somewhat erratic. Frequently, the slurry sustains relatively high resin loss and the resulting compressive strength of the consolidated pack is considerably reduced. Consequently, breakers had not been regularly employed in the commercial practice of the inventions of Copeland et al. and Carpenter et al.

In a commonly assigned application by Peter E. Clark, John S. Underwood, and Thomas M. Steiner, Ser. No. 801,667 filed May 31, 1977, it is taught that compounds such as ascorbic acid which contain an aromatic enediol or α-carbonyl enediol functional group are effective breakers for aqueous gels, even at low temperatures.

SUMMARY OF THE INVENTION

The present invention is based on the discovery that the enediol breakers described by Clark et al. are effective as breakers in aqueous epoxy resin consolidated gravel packing slurries. Such enediol breakers are not only effective as breakers, but also resin loss from the slurry and compressive strength of the resulting pack are sufficiently improved over that obtained with, for example, ammonium persulfate, that the present invention is now regularly employed commercially in treating formations having a bottomhole static temperature of about 130° F. or less.

One aspect of the invention, then, is an improved slurry suitable for use in emplacing a permeably consolidated particulate mass in communication with a permeable subterranean formation, of the type containing an epoxy resin, a particulate material, a coupling agent, a quaternary ammonium halide surfactant, an aqueous carrier fluid containing a viscosity builder, and a breaker to reduce the viscosity of the carrier fluid after a period of time. The improvement in the slurry lies in the use of a compound having an aromatic or α-carbonyl enediol functional group as the breaker component of the slurry.

Another aspect of the invention is an improved method of forming a permeably consolidated particulate mass in communication with a subterranean formation. The improvement lies in the use of the above described slurry containing said enediol compound as a breaker, as the consolidated gravel packing slurry.

A third aspect of the invention is an improved method of forming a permeably consolidated particulate mass in communication with a subterranean formation by introducing said enediol breaker into the wellbore in a gelled pad fluid either ahead of or following the consolidated gravel packing slurry itself.

FURTHER DESCRIPTION OF THE INVENTION

The present invention may be practiced in conjunction with slurries which are suitable for use as aqueous epoxy resin consolidated gravel packing slurries such as those taught in said Copeland et al. U.S. Pat. No. 4,074,760 and Ser. No. 807,094 and in said application Ser. No. 737,455 by Carpenter et al. The teachings of said patent and allowed applications are expressly incorporated herein.

Slurries suitable for use herein contain an effective quantity of a quaternary ammonium halide. Suitable quaternary ammonium halides correspond to the formula

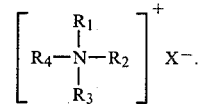

$R_1$ and $R_3$ are each independently a lower alkyl, a hydroxy substituted lower alkyl, or a polyoxyethylene alkyl moiety of the formula—$(CH_2CH_2O)_nH$ where n is 2 or 3. By lower alkyl is meant a straight chain or branched 1- through 4-carbon moiety. Preferably, $R_1$ and $R_3$ each contain at least one hydroxyl substitution. $R_2$ is (a) an 8- through 18-carbon moiety which may be saturated or unsaturated, branched or straight, but not cyclic, (b) hydroxy substituted lower alkyl, or (c) a polyoxyethylene alkyl moiety of the formula—$(CH_2CH_2)_nH$ where n is 2 or 3. $R_4$ is an aliphatic hydrocarbon moiety which may be branched or straight, saturated or unsaturated, or, $R_4$ may be an alkyl aryl moiety. $R_4$ in either case has from 7-19 carbon atoms. Preferably, $R_4$ is an alkyl aryl moiety, most preferably benzyl or alkyl substituted benzyl, e.g., dodecylbenzyl. a particularly preferred sub-genus of surfactant are alkyl ($C_8$–$C_{18}$) bis(2-hydroxyethyl) benzyl ammonium chlorides and mixtures thereof. Another preferred sub-genus are compounds corresponding to the formula

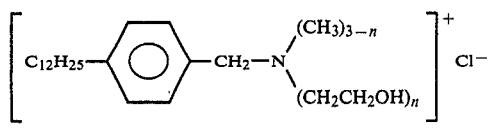

where n=1, 2, or 3.

Except for the breaker component, one skilled in the art will be able to carry out the present invention by referring to the teachings of said Copeland et al. and Carpenter et al. However, subsequent to the filing date of said applications, further developments within the scope of the inventions there disclosed have been made. Thus, the best mode contemplated for carrying out the present invention incorporates these further refinements of the Copeland et al. invention. In particular, it was taught that an accelerator such as salicylic acid, benzoic acid, phenol, etc., could be employed. The particular accelerator presently most preferred is dimethylaminomethylphenol. Although not essential, it is normally used where the well has a bottomhole static pressure of about 130° F. or less. Also, based on a discovery by said Constien and James R. Colemen, it is now contemplated that the coupling agent be prereacted with a stoichiometric excess of the curing agent to form a mixture of the curing agent and an adduct having one moiety which promotes adhesion to the particulate and another moiety which reacts with the epoxy resin. Thus, for example, 54 grams of 3-glycidoxypropyltrimethoxysilane may be reacted with 150 grams of polymethylene polyphenylamine in a nitrogen atmosphere at 70° C. until substantially all of the epoxysilane is reacted as can be determined by chromatographic monitoring of the reaction, e.g., about 5 hours. The reaction product may be diluted with a suitable solvent such as ethyleneglycol ethyl ether if desired.

The enediol employed as a breaker may be any compound containing an

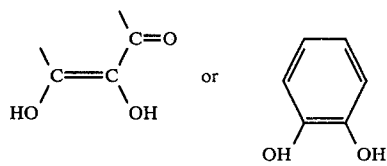

group (cis- or trans-), which is sufficiently soluble in the aqueous medium so that an amount effective to break the gel can be dissolved in the fluid at the temperature of the gel. Suitable compounds include, for example, (D,L) ascorbic acid, dihydroxymaleic acid, catechol, catechol derivatives wherein the enediol functional group remains underivatized such as 1,2-dihydroxytoluene, rhodizonic acid, 6-desoxy-(L)-ascorbic acid, L-ascorbic acid 6-palmitate, 2,3-dihydroxy acrylaldehyde (i.e., reductone), reductic acid, croconic acid, and the like, all of which are known compounds prepared by known methods. Soluble salts of the aforementioned compounds may also be employed.

As used herein and in the appended claims, "ascorbic acid" includes L-ascorbic acid, commonly known as vitamin C; D-ascorbic acid, sometimes referred to as erythorbic, D-erythro-ascorbic acid, or isoascorbic acid; and mixtures of the D and L isomers.

Although the present invention is not limited by any particular theory, it is believed the enediol is ionized in solution to a monoion

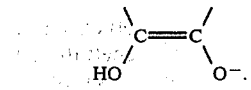

and a dianion

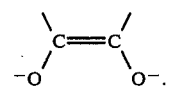

It is further believed the oxygen present reacts with the monoanionic species to generate an oxidizing species and the oxidized form of the enediol, namely

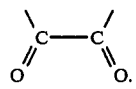

The reaction of oxygen with the monoion is known to be catalyzed by the presence of transition metal ions, such as $Fe^{+3}$, $Cu^{+2}$, $Mn^{+2}$, and $Ag^{+}$. See generally, Bender, *Mechanisms of Homogenous Catalysis from Protons to Proteins*, John Wiley & Sons, 1971, Chapter 8, particularly page 235 et seq. Accordingly, the presence of a catalytic amount of at least one of such ions is preferred to accelerate the break of the gel. However, as was pointed out in Ser. No. 737,455, free polyvalent metal cations can be detrimental to the performance of the slurry. It appears that the presence of the ions in chelated form, however, provides adequate catalysis to permit the breaker to function. The need for the catalytic species varies from compound to compound. Ascorbic acid, for example, functions adequately in deionized water, whereas other compounds such as dihydroxymaleic acid function quite slowly absent the catalyst. As a practical matter, however, most any water source will have an ample concentration of at least one of such ions, unless the water employed has been deliberately deionized.

The optimum amount of breaker employed depends on many factors, such as the induction period desired, the particular gelling agent, the particular breaker, the fluid temperature, whether or not a buffer is employed, and the like. Thus, the nature of the invention does not lend itself to statement of a sharply defined operable concentration range for the breaker. Typically, however, the concentration of the breaker by weight of water is from about 0.005–0.05 percent. A preferred range, particularly where ascorbic acid is employed, is about 0.01–0.025 percent, and most preferably about 0.012 percent (1 lb/1000 gallons). When the breaker is incorporated in the slurry itself and no gelled pad fluid is employed, the above quantities are based on the carrier fluid portion of the slurry. Preferably, however, the breaker is incorporated in a gelled pad fluid which is injected either ahead of, behind, or preferably both ahead of and behind, the slurry. In the latter embodiment, the foregoing quantities of breaker are based on the total amount of water in the gelled pad as well as in the carrier fluid portion of the slurry.

In addition, there may optionally be included a slightly basic pH buffer, such as sodium bicarbonate, potassium dihydrogen phosphate/disodium hydrogen phosphate mixtures, ammonia/ammonium chloride, and the like. By controlling the pH immediately after addition of the breaker to from about pH 7 to a pH approaching the pK of the second ionizable hydrogen of the enediol group, the breaking action can be delayed as desired. Once the gel begins to break acid is generated and the generated acid lowers the pH thereby promoting an increasingly rapid rate of break thereafter.

For breakers of this type to function properly, there must be present a small amount of dissolved oxygen, e.g., to the extent of at least about 1 part per million. However, this is not a significant limitation as most water sources inherently have sufficient dissolved oxygen.

EXAMPLES

EXAMPLE 1

An experimental field test of the present invention was carried out Mar. 15, 1977 under the supervision of laboratory personnel in a well having a bottomhole static temperature of 105° F. The well had been producing a very viscous oil which carried sand out of the formation. The procedure tested was as follows:

a. 1 gallon of gamma-aminopropyltriethoxysilane and 11 gallons of a solution of, by weight, 80 percent D.E.R. 331 brand epoxy resin, which is a liquid epoxy resin of the bisphenol-A/ epichlorohydrin type having an average epoxide equivalent weight of about 190, 12 percent xylene, and 8 percent ethylene glycol ethyl ether were admixed about 6 hours before final preparation of the slurry.

b. 12 barrels of a kerosene/aromatic solvent preflush were injected to clean the wellbore.

c. 1.5 gallons of the alkylbis(2-hydroxyethyl)benzylammonium chloride surfactant blend described in Example 6 of Copeland et al. (hereinafter "Surfactant Blend") were added to 10 barrels of 1% KCl brine and injected as a spacer.

d. Fluid for a pad and for use as the carrier fluid in the slurry was prepared by admixing 33.3 lbs of hydroxyethylcellulose in 14½ barrels of 1% KCl brine and then adding 17.6 lbs of Na$_4$ EDTA. The fluid was then split into two portions, one of 12 barrels for use as a pad fluid and one of 2½ barrels for use as the carrying fluid portion of the slurry. 2.5 gallons of Surfactant Blend were added to the 12 gallon pad fluid, and 1 gallon of Surfactant Blend was added to the 2½ barrel carrying fluid aliquot.

e. The resin-coupling agent mixture prepared in step (a) was admixed with 6 gallons of a 40 weight percent solution of methylenedianaline curing agent in ethylene glycol ethyl ether and 0.5 gallons of dimethylaminomethyl phenol accelerator.

f. 1900 lbs of 20-40 mesh sand was added to the 2½ barrels of carrying fluid prepared in step (d).

g. The resin system of step (e) and the carrier-sand mixture of step (f) were admixed for 15 minutes to form the slurry (about 5 barrels total volume).

h. 0.5 lb ascorbic acid was dissolved in about a half gallon of water, and this was added to the 12 barrels of pad fluid.

i. 8 barrels of the pad fluid were injected, followed by the slurry of step (g), followed by the remaining 4 barrels of pad fluid. The foregoing sequence of fluids was displaced with 1% KCl brine. The well was shut in for 24 hours to permit the slurry to consolidate. The excess hardened slurry was drilled out and production resumed with virtually no sand production.

EXAMPLE 2 AND COMPARISON RUN 1—slurries prepared with and without breaker

A base carrier fluid was prepared by admixing
3000 ml Tulsa tap water
6.0 potassium chloride
19.8 g hydroxyethyl cellulose
4.8 g Na$_4$EDTA
30 ml Surfactant Blend hereinabove described.
The viscosity was measured as 129 cps at 100 rpm (75° F.) on Fann 35 viscometer. To each of two jars was added 16.7 g of the above carrying fluid. To one jar, 0.3 ml of a water solution containing 0.034 g of dissolved ascorbic acid was added. The other jar was the control sample. To each jar was added 360 g of U.S. sieve no. 20-40 gravel.

A resin system was prepared by admixing for 40 minutes, 4 ml of the silane described in item (a) of Example 1 and 44 ml of the resin-solvent mixture described in said item (a). To this was added 22 ml of the methylenedianaline solution described in item (e) of Example 1, and the entire mixture was blended for one minute.

27 ml of the thusly prepared resin system and 0.5 ml of dimethylaminomethyl phenol were added to each of the jars containing the carrier fluid, and the contents were mixed for 10 minutes at room temperature (approximately 25° C.). Stirring was discontinued and the slurries were placed in a 130° F. both for 10 minutes to simulate heat up. The slurries were then compacted in 50 cc syringes and cured at 130° F. for 4 hours according to the Laboratory Screening Test Procedure described in U.S. Pat. No. 4,074,760.

Results were as follows:

Percent Resin Loss

Example 2--with breaker
    Easy squeeze - 1.5% resin loss
    Hard squeeze - 1.5% resin loss
Comparison Run 1--no breaker
    Easy squeeze - 0.7% resin loss
    Hard squeeze - 1.6% resin loss Viscosity of Squeezed Off Fluids The viscosity of squeezed off fluid was determined. Gardener viscosity tubes were employed because of the small volume.

Example 2—with breaker, Gardener "A" (approximately 50 centistokes)

Comparison Run 1—without breaker, Gardener "H" (approximately 200 centistokes)

Compressive Strength Under Ambient Conditions (after 4 hr. cure at 130° F.

(Cores were removed from syringes and sawed to 1¼" in length.)

Example 2--with breaker
    Easy squeeze - 1740
    Hard squeeze - 2010

Comparison Run 1--without breaker
Easy squeeze - 1930
Hard squeeze - 1710

It should be noted the above compressive strengths were determined after only 4 hours at 130° F. The consolidated pack would have sufficient strength at that point so that drilling out operations could begin safely. However, the strengths of the packs in a 130° F. well would continue to increase over about a 10-hour period to a strength of 2500–3500 psi, usually about 2800 psi.

What is claimed is:

1. In a slurry suitable for use in emplacing a permeably consolidated particulate mass in communication with a permeable subterranean formation, of the type containing an epoxy resin-solvent mixture, a curing agent for the epoxy resin, a particulate material, a coupling agent, a quaternary ammonium halide surfactant, an aqueous carrier fluid containing a viscosity builder, and a breaker to reduce the viscosity of said carrier fluid after a period of time, the improvement which comprises: as the breaker, a compound having an aromatic or α-carbonyl enediol functional group.

2. The improved slurry of claim 1 wherein the viscosity builder is selected from the group consisting of galactomannan gums, modified galactomannan gums, cellulose derivatives, acrylic polymers, and polyvinyl alcohol, and the breaker is selected from the group consisting of ascorbic acid, dihydroxymaleic acid, catechol, catechol derivatives, rhodizonic acid, 6-desoxy-(L)ascorbic acid, L-ascorbic acid 6-palmitate, 2,3-dihydroxy acrylaldehyde, reductic acid, croconic acid, and soluble salts thereof.

3. The improved slurry of claim 1 or 2 wherein the breaker is ascorbic acid.

4. The improved slurry of claim 3 wherein the viscosity builder is hydroxyethylcellulose.

5. In a method of forming a permeably consolidated particulate mass in communication with a permeable subterranean formation wherein a pumpable slurry is provided by mixing together in a suitable quantity and sequence, an epoxy resin-solvent mixture, a curing agent for the epoxy resin, a particulate material, a coupling agent, a quaternary ammonium halide surfactant, an aqueous carrier fluid containing a viscosity builder, and a breaker to reduce the viscosity of said carrier fluid after a period of time, wherein the slurry is introduced through a wellbore into communication with said formation, and wherein the so employed slurry is cured to form a consolidated particulate mass, the improvement which comprises: admixing in the slurry as the breaker, an effective amount of a compound having an aromatic enediol or α-carbonyl enediol functional group.

6. The improved method of claim 5 wherein the viscosity builder is selected from the group consisting of galactomannan gums, modified galactomannan gums, cellulose derivatives, acrylic polymers, and polyvinyl alcohol, and the breaker is selected from the group consisting of ascorbic acid, dihydroxymaleic acid, catechol, catechol derivatives, rhodizonic acid, 6-desoxy-(L)ascorbic acid, L-ascorbic acid 6-palmitate, 2,3-dihydroxy acrylaldehyde, reductic acid, croconic acid, and soluble salts thereof.

7. The improved method of claim 5 or 6 wherein the breaker is ascorbic acid.

8. The improved method of claim 7 wherein the viscosity builder is hydroxyethyl cellulose.

9. In a method of forming a permeably consolidated particulate mass in communication with a permeable subterranean formation wherein a pumpable slurry is provided by mixing together in a suitable quantity and sequence, an epoxy resin-solvent mixture, a curing agent, a coupling agent, an aqueous carrier liquid containing a viscosity builder, a particulate material, and a quaternary ammonium halide surfactant, wherein the slurry is introduced through a wellbore into communication with said formation, and wherein the so emplaced slurry is cured to form a consolidated particulate mass, the improvement which comprises:

preparing a pad fluid comprising an aqueous liquid containing a viscosity builder and a breaker comprising a compound having an aromatic enediol or α-carbonyl enediol functional group; and injecting said pad fluid containing said breaker into said borehole immediately prior to, immediately after, or both immediately prior or after, introducing said slurry.

10. The improved method of claim 9 wherein the viscosity builder in said pad is that employed in said slurry, each being selected from the group consisting of galactomannan gums, cellulose derivatives, acrylic polymers, and polyvinyl alcohol, and the breaker is selected from the group consisting of ascorbic acid, dihydroxymaleic acid, catechol, catechol derivatives, rhodizonic acid, 6-desoxy-(L)ascorbic acid, L-ascorbic acid 6-palmitate, 2,3-dihydroxy acrylaldehyde, reductic acid, croconic acid, and soluble salts thereof.

11. The improved method of claim 9 or 10 wherein the breaker is ascorbic acid.

12. The improved method of claim 11 wherein the viscosity builder is hydroxyethyl cellulose.

* * * * *